(No Model.)
W. W. REYNOLDS.
SCALE.
No. 269,113. Patented Dec. 12, 1882.
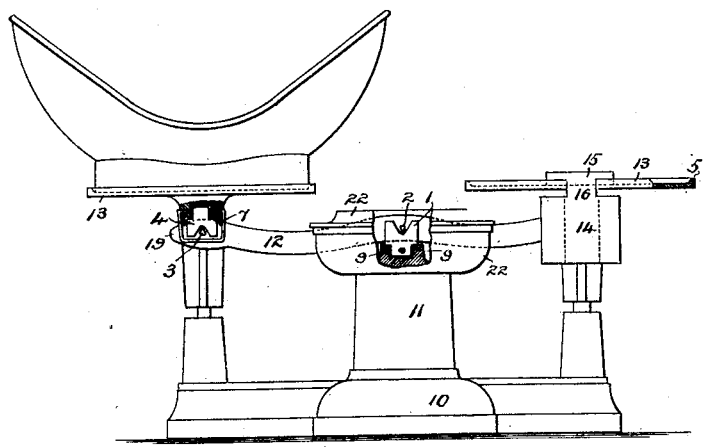
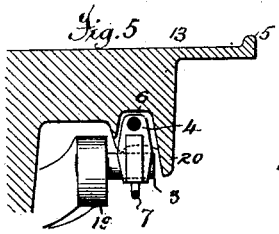
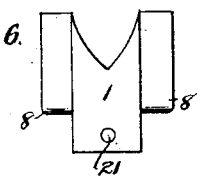
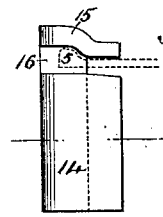
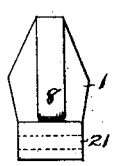
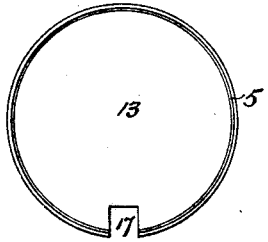
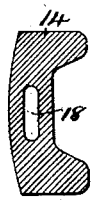
Attest;
Geo. H. Graham
A. N. Jasbera
Inventor,
Wm. W. Reynolds,
by Munson & Philipp
Attys

UNITED STATES PATENT OFFICE.

WILLIAM W. REYNOLDS, OF RUTLAND, VERMONT, ASSIGNOR TO THE HOWE SCALE COMPANY, OF SAME PLACE.

SCALE.

SPECIFICATION forming part of Letters Patent No. 269,113, dated December 12, 1882.

Application filed September 26, 1882. (No model.)

*To all whom it may concern:*

Be it known that I, WILLIAM W. REYNOLDS, a citizen of the United States, residing in the city of Rutland, county of Rutland, and State of Vermont, have invented certain new and useful Improvements in Scales, fully described and represented in the following specification and the accompanying drawings, forming a part of the same.

This invention relates to that class of scales used principally by grocers and other retail dealers for weighing small quantities of the various articles supplied to customers, and which are known in the art and to the trade by the general name of "counter" or "single-lever" scales.

It is the object of the invention to improve these scales in certain particulars, so as to render them more accurate and reliable, and also to add to their convenience when in use.

To these ends the invention consists in certain details in the construction of the various parts, which will be hereinafter fully explained and particularly pointed out.

In the accompanying drawings, Figure 1 is a side elevation, partly in section, of a counter-scale embodying the present invention; Fig. 2, a plan view of the weight-platform; Fig. 3, a side elevation of the scoop-weight or balance; Fig. 4, a horizontal section of the same; Fig. 5, a sectional detail illustrating the manner of making the bearings for the knife-edges self-adjusting; and Figs. 6 and 7 are side and end elevations, respectively, of one of these bearings.

The scale shown in the present case is in its general construction one of the ordinary forms of counter or single-lever scales, consisting essentially of a base, 10, from the center of which rises a post, 11, supporting the bearings 1 for the central knife-edges, 2, of the lever or beam 12 of the scale. This lever is provided at each end with the usual yoke, 19, and knife-edges 3, upon which rest bearings 4, supporting the usual weight and scoop platforms 13.

In using scales of this class it is often desirable, owing to the nature of the articles to be weighed, to remove the scoop, so as to place the article directly upon the platform, and, in order that the scale may exactly balance when weighing with as well as without the scoop, it is necessary to provide a weight which can be used upon the weight-platform to balance the scoop. The weight which has heretofore been provided for this purpose has been a flat piece of metal adapted to rest upon the top of the weight-platform, and closely resembling the ordinary weights, except that it was somewhat thinner. The shape of this weight made it inconvenient to handle, and its close resemblance to the other weights was the occasion of frequent errors in weighing, owing either to its being mistaken for some one of the other weights or to its being allowed to remain upon the weight-platform when the scoop was removed. These difficulties are obviated in the present invention by making the scoop weight or balance 14 of the form shown in Figs. 3 and 4, or of other form capable of being conveniently grasped and handled, and readily distinguishable from the other weights, and providing its upper end with a head, as 15, connected to the body of the weight by a narrow neck, 16, as shown in Figs. 1 and 3. The weight-platform of the scale is provided at a point upon one of its sides and in line with its knife-edges with a recess, 17, as shown in Fig. 2, into which the neck 16 of the weight enters, its head 15 resting upon the top of the platform, so that when in use the weight is suspended from the edge of the platform, as shown in Fig. 1. The head 15 of the weight is of such form, as shown in Fig. 3, that it will engage with the flange 5 of the platform and prevent the weight from being accidentally thrown from its place. The weight 14 is provided with the usual opening, 18, into which lead can be run to properly balance the scale.

The bearings 14, upon which the knife-edges act, instead of being, as heretofore, made rigid, are in the present invention made capable of a slight oscillation, so as to readily adjust themselves to the knife-edges and permit the latter to rest squarely upon them. To provide for this self-adjustment the bearings are made independent of the post 11 and platforms 13, and are provided with convex bearing-surfaces, which rest in concave bearings in said post and platforms.

Referring particularly to Fig. 5, it will be seen that the platforms 13 are provided with concave seats 6, in which rest the upper convex ends of the knife-edge bearings 4, so that the latter are free to oscillate slightly in the direction of the length of said knife-edges. These bearings are prevented from dropping from their seats by reason of the wires 7, which pass through the sides of said seats and enlarged holes in the bearings, as shown in Figs. 1 and 5. The wires 7 are also of sufficient length to be bent around beneath the bearings 4 and form loops, which, in case the platforms 13 are lifted, will engage with the knife-edges and prevent the platforms and bearings from being thrown out of proper position. The platforms 13 are provided with projections 20, which extend downward, as shown in Fig. 5, so as to entirely cover the bearings 4 and the knife-edges and protect them from dirt or anything liable to clog or cause friction. The bearings 1 for the central knife-edges are also arranged to operate in substantially the manner just described. They are made independent of the post 11, and are provided with convex shoulders 8, which rest in concave seats 9 in said post, thus permitting the bearings to oscillate slightly in the direction of the length of the knife-edges 2, as shown in Figs. 1, 6, and 7. These bearings are also prevented from being jostled out of their seats by a wire rivet, which passes through the sides of their seats and enlarged openings 21 in their bases, and they are also protected from the accumulation of dirt by a casing, 22, secured to the post 11.

What I claim is—

1. In a single-lever scale, the combination, with the lever and platforms thereof, one of which is provided with a recess, as 17, of a weight, as 14, provided with a head, as 15, and neck, as 16, substantially as described.

2. The combination, with the weight-platform 13, having flange 5 and recess 17, of the scoop-weight 14, having neck 16 and head 15, the latter being formed to fit over the said flange and hold the weight in position, substantially as described.

3. The combination, with the lever, as 12, and its knife-edges, as 2 3, of adjustable bearings, as 1 4, substantially as described.

4. The combination, with the lever, as 12, and its knife-edges, as 2 3, of adjustable bearings, as 1 4, and casings, as 20 22, for protecting the same, substantially as described.

5. The combination, with an adjustable bearing, as 4, and its knife-edge, of the combined rivet and loop 7, substantially as described.

In testimony whereof I have hereunto set my hand in the presence of two subscribing witnesses.

WM. W. REYNOLDS.

Witnesses:
  J. F. MERRILL,
  LEROY W. BALDWIN.